June 9, 1959
E. M. BORG
2,889,736
OIL TESTING APPARATUS
Filed Aug. 17, 1954
2 Sheets-Sheet 1
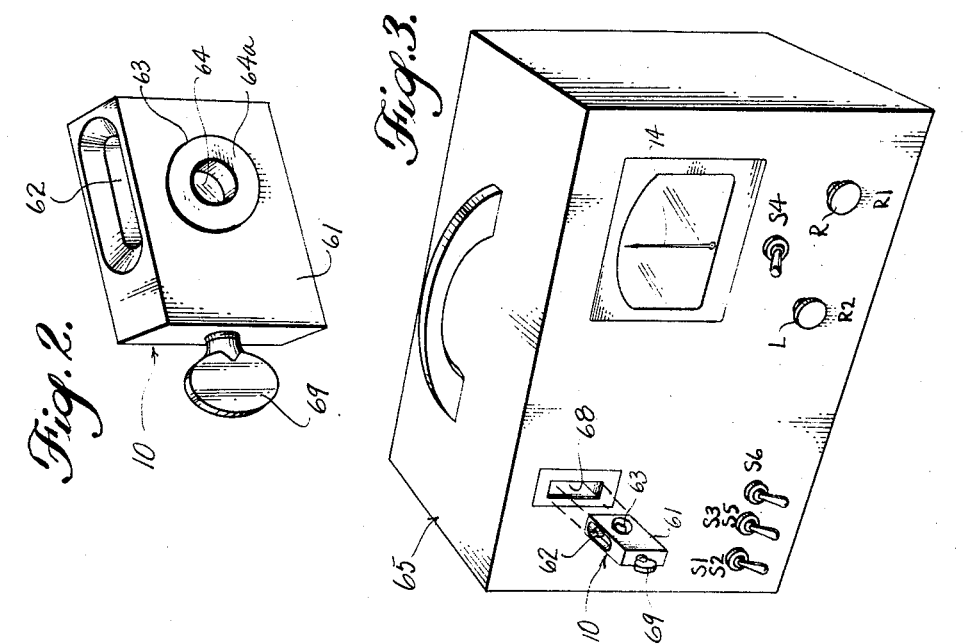
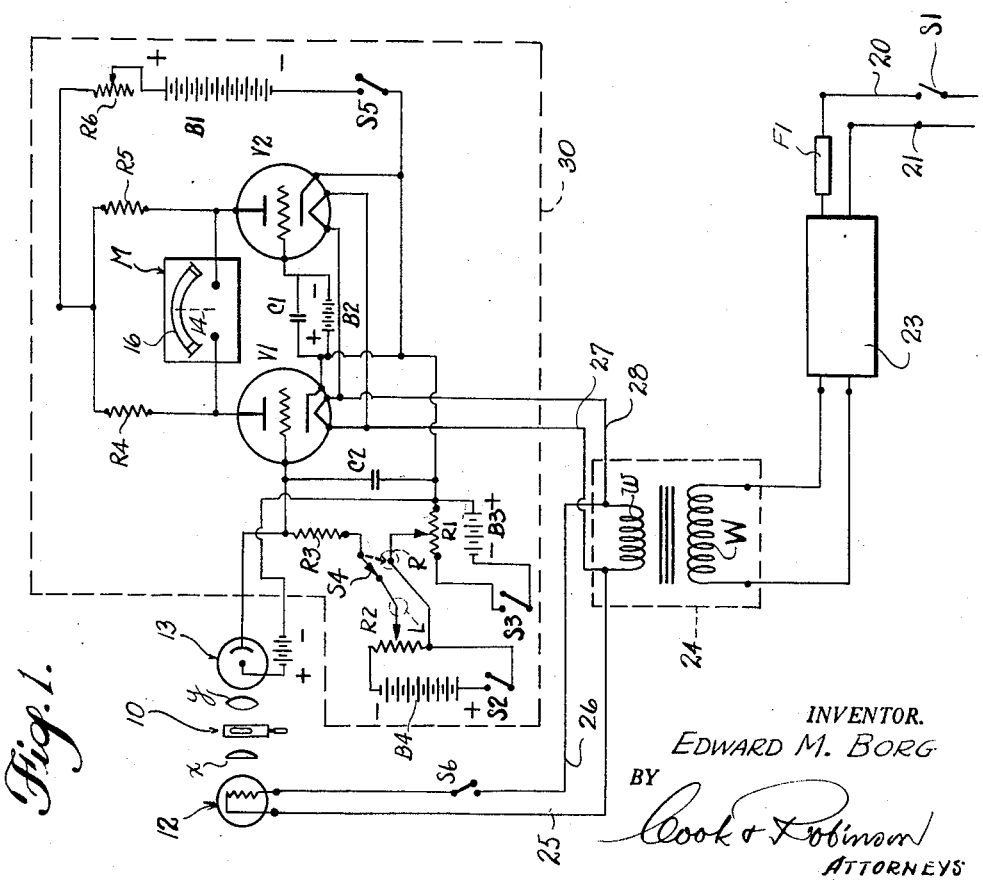
INVENTOR.
EDWARD M. BORG
BY
Cook & Robinson
ATTORNEYS June 9, 1959
E. M. BORG
2,889,736
OIL TESTING APPARATUS
Filed Aug. 17, 1954
2 Sheets-Sheet 2
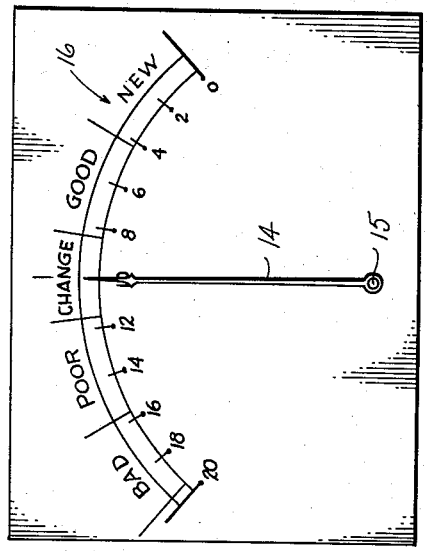
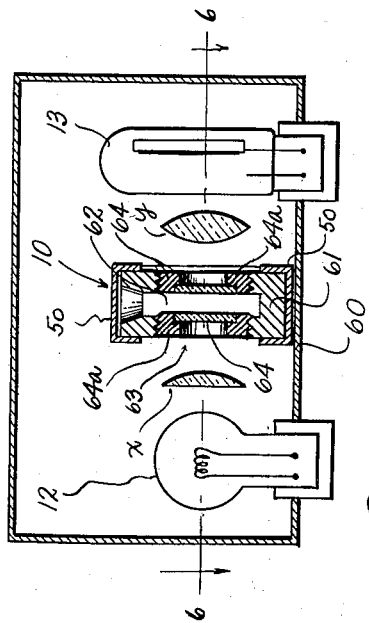
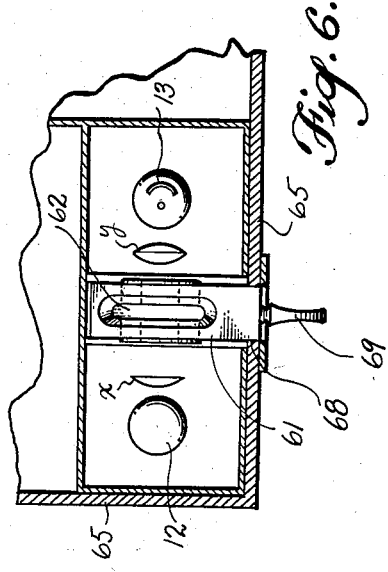
INVENTOR.
EDWARD M. BORG
BY
Cook & Robinson
ATTORNEYS United States Patent Office 2,889,736
Patented June 9, 1959

2,889,736

OIL TESTING APPARATUS

Edward M. Borg, Seattle, Wash.

Application August 17, 1954, Serial No. 450,421

1 Claim. (Cl. 88—14)

This invention relates to oil testing apparatus and it has reference more particularly to an electronic apparatus for testing samples of crankcase oil taken from the engines of automobiles, trucks, tractors, boats, and the like, or from the engines of any industrial machine or apparatus, for the purpose of ascertaining the percentage of contaminants contained therein, as an aid in determining whether the oil is suitable for further use or should be changed.

It is a general practice for service station attendants who sell lubricating oil to automobile drivers, to measure the quantity of oil in the crankcase of the engine by use of a "dip stick" and, as an incident to making this measurement, to note the color of the oil that clings to the stick. If it appears black, the salesman generally calls attention to its condition and may recommend an oil change. Applicant has determined to his own satisfaction, by actual test, that the dark color or muddy appearance of crankcase oil is not always an indication of its being contaminated by soot, dust, sludge, moisture or fuel, or that it is not suitable for further use. It may be, and in many cases is, the natural color of fresh unused oil or of oil that may be somewhat contaminated but not to the extent that makes its further use undesirable or in any way dangerous to the engine.

Therefore, the general practice of service station attendants of suggesting an oil change based only upon the fact that the oil appears muddy or dark in color, without consideration to the percentage of contaminants therein, can not be relied upon.

In view of the foregoing, it has been the primary object of this invention to provide a simple, practical and effective apparatus for a visual disclosure of the approximate percentage of contaminants which are contained in the crankcase oil of an internal combustion engine or other industrial apparatus. The word "contaminants" having reference in this instance to the normal products resulting from the operation of the engine through its cycle from intake to exhaust.

It is a further object of the present invention to provide an apparatus that will visually indicate by reference to a graduated or otherwise marked dial, the percentage, or total, of contaminants in an oil sample being tested, and which also, by reference to words on the dial, will give an indication of the actual physical condition of the oil.

More specifically stated, the present invention resides in the use of an electronic apparatus for the testing of oil samples wherein the indication of extent of contamination of an oil sample under test is based on the total contaminant or contaminant pattern and the measured brightness of a concentrated light beam after passing through the sample as contained in a novel inspection slide.

Another object of the invention resides in the provision of an oil sample holding slide of novel form wherein means is provided for the precision establishment of the thickness of the oil sample at the location where the testing light beam is to be passed therethrough, and in the provision of light passing orifices in the slide of precision designated area.

Further objects and advantages of the present invention reside in the details of construction and combination of parts embodied in the apparatus, and in the mode of use of the apparatus, as will hereinafter be fully described.

In accomplishing these and other objects of the invention, I have provided the improved details of construction, the preferred forms of which are illustrated in the accompanying drawings, wherein:

Fig. 1 is a diagrammatic lay-out of the present oil testing apparatus showing the various electrical parts employed, together with the electrical circuits.

Fig. 2 is an enlarged, perspective view of the slide in which the oil sample is deposited for testing.

Fig. 3 is a perspective view of the present apparatus as embodied in a portable housing or case.

Fig. 4 is a cross-sectional view of the oil sample holding slide as disposed between the exciter lamp and photo-electric cell in a testing operation.

Fig. 5 is a face view of the meter dial on which the reading of a test is measured or indicated.

Fig. 6 is a horizontal, sectional detail taken on the line 6—6 in Fig. 4.

Briefly stated, the present invention contemplates that a sample of crankcase oil to be tested shall be placed within the compartment of a novel form of oil sample holding slide. This compartment, which receives the oil sample for testing, has aligned orifices in opposite sidewalls through which the concentrated light beam can pass, and the slide is adapted to be placed for the sample testing operation, between a source of light, or "exciter lamp," of predetermined candle power and a photo-electric cell. A sample of oil, contaminated by use will block off some of the light rays directed from the light source through the orifices to the photo-electric cell in the proportion to the percentage of total contaminants which the sample may contain, and the light sensitive photo-electric cell will be stimulated in accordance with the percentage of contaminants. Associated with the light sensitive cell is a meter whereby the extent of any stimulation thereof will be accurately measured, and it is by reference to the meter reading that the condition of the oil, in respect to its contaminants, and to the advisability of its further use, is determined.

Referring now more in detail to the drawings, and more particularly to the diagrammatic showing of parts in Fig. 1.

The chambered slide in which the oil sample is contained for testing, and later described in detail, is designated in its entirety by numeral 10. It is here shown as being disposed between the source of light 12, which in this instance is an incandescent exciter lamp and a light sensitive or photo-electric cell 13. In passing from lamp to cell, the light beam passes through lenses $x$ and $y$ which, respectively, magnify the light for passage through the sample, and then concentrate it in the cell 13.

The meter employed for measuring or visually indicating the extent of stimulation of the photo-electric cell is designated in its entirety by reference character M and it is shown to be equipped with a sensitive pointer or hand 14, adapted to swing about its pivoted support 15 along an arc 16 which is shown in Fig. 5 to be graduated in numerals; these being the key in determining the percentage of total contaminants in the sample under test. The dial arc also is marked by use of suitable words, specifically the words "bad," "poor," "change," "good" and "new," which indicate the actual physical condition of the oil.

It is further shown in Fig. 1, that alternating current voltage is supplied under control of a switch S1 to the equipment through circuit lines 20 and 21 and fuse F1 to a line voltage regulator transformer 23 and from this to the primary winding W of a step-down transformer 24. From the secondary winding w of transformer 24, current is supplied through wires 25 and 26 to the exciter lamp 12, and through wires 27 and 28 to the heater filaments of two electronic vacuum tubes designated, respectively, by reference characters V1 and V2, which are included in a bridge-type amplifier; this being herein designated by and includes the parts enclosed by the dash line enclosure 30. The lamp used is a 6–8 volt 21 candle-power lamp.

Dry cell battery B1 of 157½ volts supplies voltage through variable resistance R6 and fixed resistors R4 and R5 to the plates of tubes V1 and V2. The anode supply circuit is completed through switch S5. B2 designates a three volt dry cell fixed negative grid voltage for tube V2. B3 designates a 4½ volt dry cell which supplies grid of tube V1 with negative voltage through variable resistance R1 and selector switches S4 to fixed grid resistor R3 of tube V1. The biasing circuit is completed by closing switch S3. B4 is an additional grid bias battery connected to the grid of tube V1 through variable resistor R2 and fixed resistor R3 upon closure of switch S2 and movement of switch S4 to its full line position. It will be appreciated that when switch S4 is in the latter position a series circuit between the grid and cathode of tube V1 is completed through resistor R3, switch S4, the portion of resistor R2 below its variable tap, and the portion of resistor R1 to the right of its variable tap. Photo-electric cell 13 and its supply battery B4 are shunted across this circuit.

It will be clear to those skilled in the electronic arts that as the resistance of the cell decreases, upon illumination of the cell, the negative bias on the grid of tube VI will decrease and the impedance of tube VI will decrease accordingly. This change will of course change the current relationships in the bridge circuit, and the potential across meter M will change. The bridge circuit includes arms R4, R5, V1, and V2 connected in a closed series circuit, the meter being connected across one pair of arm junctions and battery B1 being connected across the other pair of arm junctions.

C1 and C2 designate by pass condensers from grids of V1 and V2 to the common cathode connection and are used to exclude and dampen unwanted interference in bridge circuit.

In the physical make-up of the apparatus, the exciter lamp 12, the photo-electric cell 13 and the supporting guides 50 for the slide 10 are contained in a metal housing 60 as shown in Figs. 4 and 6. The slide 10 is preferably of that form of construction shown best in Fig. 2, and comprises a rectangular block 61 formed with an oil holding chamber 62 that is open to the top side of the block. Opposite sidewalls of the chamber are formed with aligned openings 63—63 as shown in Fig. 4, within which windows 64 are threaded for easy adjustment from and toward each other. Each window comprises an encircling frame 64a of metal that is fitted with a clear crystal panel or lens that is flush with the inner face of the frame, as seen in Fig. 4. By adjusting one of these windows into or from its block opening, the predetermined and desired spacing of the lenses for the present purpose may be accurately established. The housing 60, wherein the lamp 12 and cell 13 are located together with the electrical equipment, is contained in an easily portable case 65, as shown in Fig. 6, and the slide block 61 is adapted to be inserted into this housing through registering wall openings 68 of the housing 60 and the case 65, into the supporting guides 50, and when in place, the two orifices of the slide will be located in alignment between the lamp 12 and photo-electric cell 13, as well shown in Fig. 6. A handle or knob 69 is fixed in the outer end of the block 61 for handling it and for moving it into and from the housing.

The dial portion of the meter M, along which the pointer 14 moves preferably, is like that shown in Fig. 5. It extends through an arc of approximately 90° and is divided into five successive arcs of substantially equal lengths. These five arcs are designated respectively, in clockwise direction, by the words "bad," "poor," "change," "good" and "new." The 90° arc is also divided into numbered parts, here numbered from 0 to 20, these being the key numbers which designate the percentage of contaminants in the sample.

The entire equipment can be conveniently housed in the portable case 65 which is shown in Fig. 3, for convenient use. An extension cord, not shown, may be lead therefrom for plugging into an outlet to which the circuit lines 20—21 lead to supply current to the electrical equipment, and this connection is under control of a switch S1.

The manner of use of the device for an oil test is as follows: First, close the switch S1 and allow a predetermined period for warming up the electrical equipment. Then, to initially calibrate, close the switch S3, move the double control switch S4 to dotted line position of Fig. 1 and adjust resistance R1 through control knob R to cause meter hand 14 to swing to a stop at the center of the "change" arc. Then move the double control switch S4 to full line position of Fig. 1 and adjust resistance R2 through the knob L to cause the meter hand to read at 19 on the dial. Next, a sample of oil is drawn from the crankcase by a thief pump and placed in the slide block chamber 62 to fill the space between the transparent lenses that cover the apertures of the slide. The slide is then inserted through opening 68 in the case, and moved to a position for oil test between the lamp 12 and cell 13. Then close switch S6. The pointer 14 will move along the graduated dial and come to a stop. If the pointer stops at the indication "bad," "poor," or "change," the indication is that the oil of the crankcase is so contaminated that its change is desirable. If the pointer stops within the "good" or "new" designation, then the indication is that the oil is not sufficiently contaminated to require a change.

It may be explained in connection with the showing of the switch levers and knobs in the case in Fig. 3, that the knobs R and L are for adjustment of the resistances R1 and R2. Also, that two of the switch levers of the group of three, are double purpose levers, one controls switches S1 and S2, the other controls switches S3 and S5. The third lever of the group controls switch S6. The switch levers adjacent the knobs L and R controls switch S4.

The explanation of the use of the apparatus as above given anticipates that the spacing of the lenses of the slide be spaced about 1/16" to 1/8" apart for ordinary lubricating oils, which, when fresh and unused, are yellow or golden in color. However, in view of the fact that many present day lubricating oils are given an artificial color, such as purple, blue, red, etc. for identification purposes, it is necessary that a compensating adjustment of the spacing of the lenses of the slide be made. The coloring substance may, or may not, have any particular value insofar as adding to the lubricating property or life of the oil is concerned. Ordinarily it would be expected that the coloring substance, especially if dark, would interfere with the accuracy of the reading made by the meter. However, it has been found that by adjusting the lenses of the sample holding slide to a reduced spacing, which will then require that the magnified light beam shall pass through only a very thin film of oil, the coloring material will present no interfering pattern. In other words, the coloring substance used in oil does not act as a contaminant nor does it have the characteristics of a contaminant, and therefore it has no effect on the reading of the meter provided that the thickness of the sample of oil under test be reduced to a thin film as made possible by the present slide.

The novelty of the present invention is believed to reside not only in the apparatus as a whole, but also in the provision of a slide, with the adjustably spaced lenses that provide for reducing the thickness of the oil sample to such extent that coloring in the oil has no effect on the meter readings.

Having thus described my invention, what I claim as new therein and desire to secure by Letters Patent is:

An oil testing apparatus comprising a light excluding housing, one side of said housing having an opening formed therein, guide means supported within said housing adjacent said opening, an oil sample container received within said guide means, said container being adapted for insertion and withdrawal through said opening and serving when in inserted position to prevent light from entering through the said opening, said sample container comprising a substantially rectangular block having formed therein an oil holding chamber that is open to the top side of the block, said container having opposite side walls of opaque material, said side walls having aligned threaded openings formed therethrough, a frame member threadedly mounted in each of said openings, each frame member having a transparent panel mounted therein flush with the inner face thereof, said frames being adjustable with respect to said side walls for varying the space between the inner faces of said transparent panels, an exciter lamp supported within said housing adjacent one side wall of said container, a light-magnifying lens supported within said housing between said lamp and the transparent panel supported within said one side wall, a light-sensitive cell supported within said housing adjacent the opposite side wall of said container, and a light-concentrating lens supported within said housing and interposed between said light-sensitive cell and the transparent panel supported within said opposite side wall of the container, said transparent panels and lenses being aligned with said exciter lamp and said light-sensitive cell whereby said light-sensitive cell is stimulated upon energization of said lamp, and an electrical circuit connected to said light-sensitive cell for measuring the extent of stimulation thereof, said electrical circuit including a meter in a bridge circuit including four impedances connected in closed series circuit, a source of potential connected from the junction of two of said impedances, said meter being connected across the remaining impedance junctions, means responsive to illumination of said cell for varying one of said impedances and means for initially adjusting the potential across the meter.

References Cited in the file of this patent

UNITED STATES PATENTS

| | | |
|---|---|---|
| 1,864,092 | Pearson | June 21, 1932 |
| 1,938,544 | Schoenberg | Dec. 5, 1933 |
| 1,940,772 | Schoenberg | Dec. 26, 1933 |
| 2,059,374 | Logan et al. | Nov. 3, 1936 |
| 2,062,587 | Logan et al. | Dec. 1, 1936 |
| 2,062,588 | Logan et al. | Dec. 1, 1936 |
| 2,082,252 | McDill | June 1, 1937 |
| 2,510,347 | Perkins | June 6, 1950 |
| 2,690,695 | Coates | Oct. 5, 1954 |

FOREIGN PATENTS

| | | |
|---|---|---|
| 246,050 | Germany | Apr. 23, 1912 |
| 500,892 | Great Britain | Feb. 17, 1939 |